United States Patent
Yamatsu et al.

(10) Patent No.: US 8,379,503 B2
(45) Date of Patent: Feb. 19, 2013

(54) OPTICAL INFORMATION RECORDING REPRODUCTION APPARATUS AND OPTICAL INFORMATION RECORDING REPRODUCTION METHOD

(75) Inventors: Hisayuki Yamatsu, Tokyo (JP); Tetsuhiro Sakamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/170,270

(22) Filed: Jun. 28, 2011

(65) Prior Publication Data

US 2012/0008484 A1 Jan. 12, 2012

(30) Foreign Application Priority Data

Jul. 6, 2010 (JP) ................................. 2010-154261

(51) Int. Cl.
*G11B 7/00* (2006.01)
(52) U.S. Cl. ..................................................... 369/116
(58) Field of Classification Search ............... 369/44.37, 369/94, 275.3, 47.5, 47.51, 116, 120, 121, 369/122, 47.52
See application file for complete search history.

(56) References Cited

U.S. PATENT DOCUMENTS

| | | | | |
|---|---|---|---|---|
| 5,661,711 | A * | 8/1997 | Tanaka et al. | 369/53.2 |
| 6,483,787 | B1 * | 11/2002 | Sugasawa et al. | 369/44.13 |
| 6,859,425 | B2 * | 2/2005 | Maegawa et al. | 369/47.3 |
| 7,859,974 | B2 * | 12/2010 | Tatsuta et al. | 369/103 |
| 7,903,529 | B2 * | 3/2011 | Yamasaki | 369/112.09 |
| 7,969,853 | B2 * | 6/2011 | Nakatani et al. | 369/112.24 |
| 8,023,385 | B2 * | 9/2011 | Jung | 369/103 |
| 8,077,582 | B2 * | 12/2011 | Saito et al. | 369/112.01 |
| 8,089,847 | B2 * | 1/2012 | Inoue et al. | 369/103 |
| 8,111,604 | B2 * | 2/2012 | Nakano et al. | 369/275.3 |
| 8,125,872 | B2 * | 2/2012 | Ogasawara | 369/103 |
| 8,165,005 | B2 * | 4/2012 | Ueda et al. | 369/116 |
| 8,213,279 | B2 * | 7/2012 | Kosuda et al. | 369/44.37 |

FOREIGN PATENT DOCUMENTS

JP 60-173729 * 9/1985 ................. 369/44.37

OTHER PUBLICATIONS

Kobayashi, Seiji et al., "Introduction of volumetric optical storage technology "Micro-reflector", an ultra-multilayer optical disk", Th-I-01, Sony Corporation, Kanagawa, Japan.
Gamaly, Eugene et al., "Laser-matter interaction in the bulk of a transparent solid: Confined microexplosion and void formation", The American Physical Society, 2006, pp. 214101-1 to 214101-15, Physical Review B 73.
Gu, Min et al., "Use of continuous-wave illumination for two-photon three-dimensional optical bit data storage in a photobleaching polymer", Optics Letters, Mar. 1, 1999, pp. 288-290, vol. 24, No. 5, Australia.

* cited by examiner

*Primary Examiner* — Nabil Hindi
(74) *Attorney, Agent, or Firm* — Wolf, Greenfield & Sacks, P.C.

(57) ABSTRACT

An optical information recording reproduction apparatus includes: a first light beam source; a second light beam source emitting a beam with a wavelength shorter than that of the first light beam source; and an object lens condensing the beams from the first and second light beam sources to an optical information recording medium. When information is recorded in the optical information recording medium, a recording beam is emitted from the first light beam source and a beam used to generate a signal for controlling a position of the object lens is emitted from the second light beam source. When the information of the optical information recording medium is reproduced, a reproduction beam is emitted from the second light beam source.

5 Claims, 6 Drawing Sheets

OPTICAL INFORMATION RECORDING REPRODUCTION APPARATUS AND OPTICAL INFORMATION RECORDING REPRODUCTION METHOD

BACKGROUND

The present disclosure relates to an optical information recording reproduction apparatus and an optical information recording reproduction method capable of recording and reproducing information by emitting a beam to a medium.

There has been suggested an optical recording method of performing volume recording of information by condensing a high-power laser beam on an optical information recording medium with a bulk shape and transforming the material of a recording layer near a focus (for example, see Seiji Kobayashi, Kimihiro Saito, Takashi Iwamura, Hisayuki Yamatsu, Toshihiro Horigome, Mitsuaki Oyamada, Kunihiko Hayashi, Daisuke Ueda, Norihiro Tanabe and Hirotaka Miyamoto, Tech. Digest of ISOM'09, Th-I-01 (2009)). According to this method, it is possible to perform the volume recording using an inexpensive cheap medium and realize low cost and large-capacity optical recording.

In the optical recording method, it is particularly preferable that a recording medium has a two-photon absorption property. Since the two-photon absorption property is shown only in a region where an optical power density is extremely high, a recording beam is absorbed only in the vicinity of the focus. Therefore, the other regions of the recording medium are not subjected to the attenuation. Accordingly, since the recording beam can arbitrarily reach any depth position in the recording medium, the volume recording can efficiently be performed.

In the optical recording, it is considered that voids (vacant holes) are formed in a thermal manner or an ablation manner by the energy of the beam two-photon absorbed near the focus of the beam condensed to the medium (for example, see Eugene G. Gamaly, Saulius Juodkazis, Koichi Nishimura, and Hiroaki Misawa, Phys. Rev. B 73, 214101 (2006)).

Besides a case where an infrared pulse laser is used in recording, it has been reported that two-photon absorption recording is realized by an infrared CW laser (for example, see Min Gu and Daniel Day, Opt. Letters, 24, 5 (1999)).

SUMMARY

In the above-described optical recording method, it is supposed that a blue laser having an optical wavelength in the vicinity of 405 nm is used in both recording and reproducing in order to improve recording density. In general, however, the efficiency (cross-sectional area of two-photon absorption) of the two-photon absorption by a blue beam is considerably lower than that of a red beam or an infrared beam. Moreover, a practical material is not widely known. Accordingly, the method according to the related art has a problem in that it is difficult to realize a high recording transmission rate using a recording material with a good two-photon absorption property.

In addition, when information recorded in an optical information recording medium is reproduced, it is advantageous to use the blue beam having an optical wavelength in the vicinity of 405 nm in terms of the improvement in recording density.

It is desirable to provide an optical information recording reproduction apparatus and an optical information recording reproduction method capable of realizing a high recording transmission rate and reproducing information recorded at high density.

According to an embodiment of the disclosure, there is provided an optical information recording reproduction apparatus including: a first light beam source and a second light beam source emitting a beam with a wavelength shorter than that of the first light beam source. The optical information recording reproduction apparatus further includes: an object lens condensing the beams from the first and second light beam sources to an optical information recording medium; and a beam detection unit detecting a beam reflected from the optical information recording medium. When information is recorded in the optical information recording medium, a recording beam is emitted from the first light beam source and a beam used to generate a signal for controlling the position of the object lens is emitted from the second light beam source. When the information of the optical information recording medium is reproduced, a reproduction beam is emitted from the second light beam source.

According to another embodiment of the disclosure, there is provided an optical information recording reproduction method including emitting a recording beam from a first light beam source and emitting a beam with a wavelength shorter than that of the recording beam emitted from the first light beam source from the second light beam source and generating a signal for controlling a position of an object lens an when information is recorded in an optical information recording medium. Moreover, the optical information recording reproduction method includes emitting the beam with a wavelength shorter than that of the recording beam emitted from the first light beam source from the second light beam source and reading the information recorded in the optical information recording medium, when the information is reproduced.

According to the optical information recording production apparatus and the optical information recording production method in the embodiments of the disclosure, the first light beam source emits the recording beam with the wavelength longer than that of the reproduction beam and the second light beam source emits the reproduction beam with the wavelength shorter than that of the recording beam. By emitting the recording beam with the wavelength longer than that of the reproducing laser beam from the first light beam source, a recording material with a good two-photon absorption property is applicable to the recording medium, thereby realizing a high recording transmission rate. Moreover, by emitting the reproduction beam with the wavelength shorter than that of the recording beam from the second light beam source, it is possible to read the information recorded at high density due to the two-photon absorption. Furthermore, when the information is recorded in the recording medium using the first light beam source, the position of the object lens can be controlled at high precision using the beam with the short wavelength emitted from the second light beam source.

According to the embodiments of the disclosure, it is possible to provide the optical information recording reproduction apparatus and the optical information recording production method capable of realizing the high recording transmission rate and reproducing information recorded at high density.

DETAILED DESCRIPTION OF EMBODIMENTS

Hereinafter, embodiments of the disclosure will be described. However, the embodiments of the disclosure are not limited to the following examples.

The description of the embodiments will be made in the following order.

1. First Embodiment of Optical Information Recording Reproduction Apparatus
2. Second Embodiment of Optical Information Recording Reproduction Apparatus 1. First Embodiment of Optical Information Recording Reproduction Apparatus Example of Configuration of Optical Information Recording Reproduction Apparatus Hereinafter, an optical recording method will be described according to a first embodiment of the disclosure.

Figure 1:
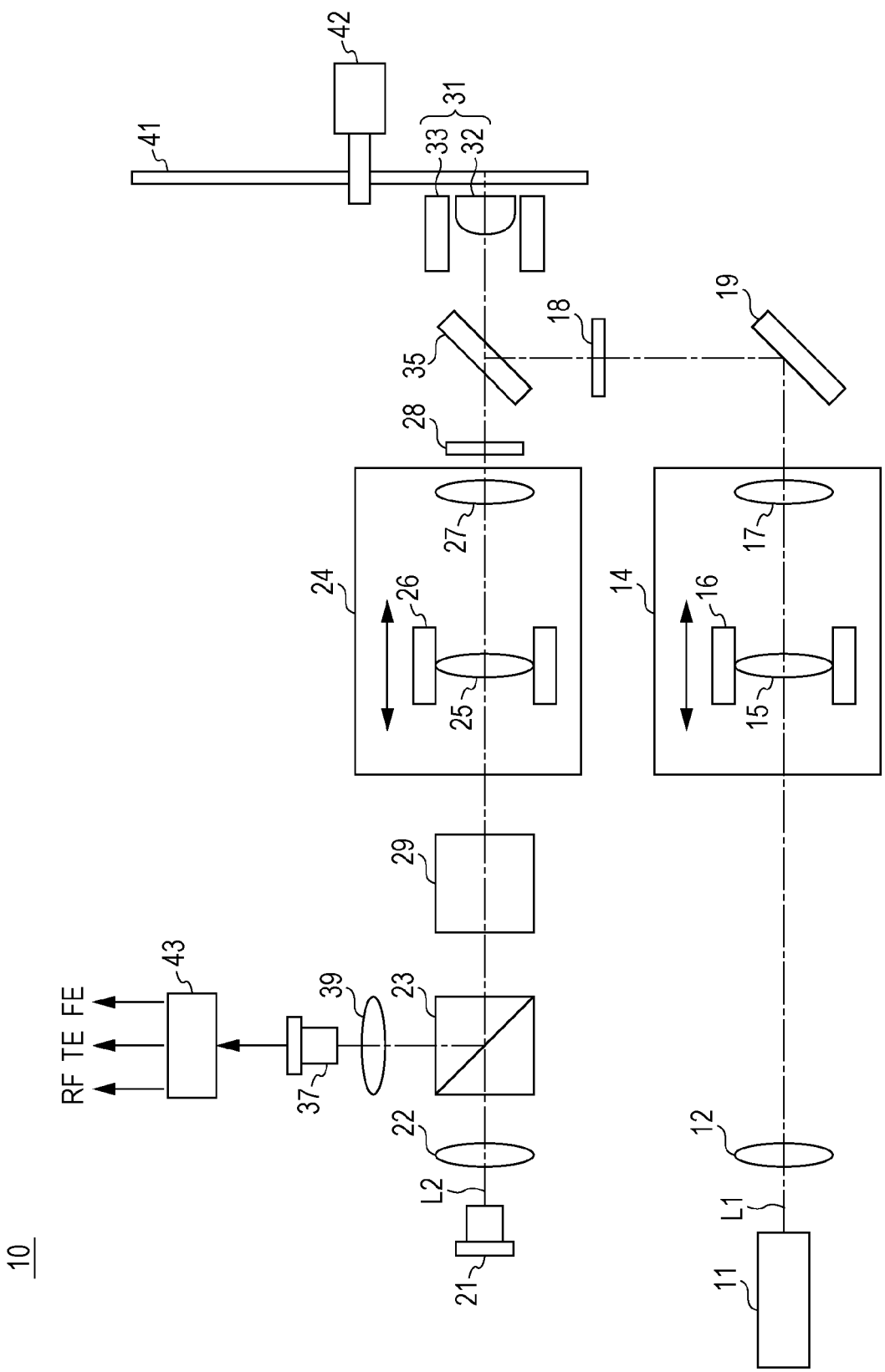
FIG. 1 is a diagram of the overall configuration of an optical information recording reproduction apparatus according to a first embodiment of the disclosure.

FIG. 1 shows the overall configuration of an optical information recording reproduction apparatus associated with the optical recording method according to this embodiment.

The optical information recording reproduction apparatus shown in FIG. 1 includes a first laser beam source 11 serving as a first beam source and a second laser beam source 21 serving as a second beam source. A first laser beam from the first laser beam 11 and a second laser beam from the second laser beam 21 are emitted to an optical information medium 41.

A first collimator lens 12, a first relay lens 14, a mirror 19, and a first quarter wavelength plate (QWP) 18 are provided along an optical path L1 of the first laser beam source 11.

A second collimator lens 22, a polarized beam splitter 23, an optical attenuator 29, a second relay lens 24, and a second quarter wavelength plate (QWP) 28 are provided along an optical path L2 of the second laser beam source 21. A fifth condensing lens 39 and a photo-detector (PD) 37 serving as an optical detection unit detecting a beam reflected from the optical information recording medium 41 are provided along an optical path divided from the polarized beam splitter 23.

A dichroic mirror (DCM) 35 reflecting the first laser beam and passing the second laser beam is disposed at the intersection between the optical path L1 of the first laser beam source 11 and the optical path L2 of the second laser beam source 21. Moreover, an object lens unit 31, the optical information medium 41, and a spindle 42 are provided along an optical path in which the two beams are combined with each other in the dichroic mirror 35.

The first laser beam source 11 is a beam source configured to record information in the optical information recording medium 41. The first laser beam source 11 is a laser beam source which generates an ultra-short pulsed-laser beam at a predetermined time interval. The ultra-short pulse is a pulse whose time duration is on the order of femtoseconds to picoseconds. For example, a crystal of Ti:S (titanium doped sapphire) is used as a laser medium. The first laser beam emitted from the first laser beam source 11 is a laser beam which is in a linearly polarized state. A wavelength $\lambda 1$ of the first laser beam is the wavelength of a red beam with $600\,\text{nm} \leq \lambda 1 \leq 700\,\text{nm}$ or the wavelength of an infrared beam with $730\,\text{nm} \leq \lambda 1 \leq 830\,\text{nm}$.

When information is recorded using the above-described two-photon absorption, the size of the void (record mark) formed in a recording layer of the optical information recording medium 41 depends on many parameters such as an optical spot diameter, the light absorption characteristic of a medium, viscous elasticity of a medium, and the peak power of a recording beam. It is considered that a void smaller than the diameter of the recording beam spot can be sufficiently formed by optimizing these parameters.

Since the efficiency of the two-photon absorption initially increases in proportion to the square of a light intensity, the diameter of the recording beam spot becomes necessarily smaller than the diameter of a spot determined in a light intensity distribution considered to be important in the optical disc according to the related art.

It is considered that the same in-plane recording density as that of BD (Blu-ray Disc: registered trademark) is achieved due to this reason even when recording is performed using a laser beam with a wavelength longer than a wavelength of 405 nm of a blue color used in the BD according to the related art, for example, a red laser beam with a wavelength of 640 nm.

On the other hand, when the information is reproduced, it is also necessary to ensure the same optical resolution as that of BD in order to read mark lines recorded at the same density of that of BD. Accordingly, a blue laser with a wavelength of, for example, 405 nm is preferably used as the reproduction laser beam.

The first collimator lens 12 allows the first laser beam emitted from the first laser beam source 11 to be a parallel beam and emits the parallel beam to the first relay lens 14.

The first relay lens 14 includes a first condensing lens 15, a first actuator 16, and a third condensing lens 17. The first actuator 16 displaces the first condensing lens 15, and then the first condensing lens 15 being displaced and the third condensing lens 17 adjust the laser beam in accordance with a predetermined radiation or convergence state to emit the laser beam to the first QWP 18. The focal position of the first laser beam is controlled in the depth direction of the recording layer of the optical information recording medium 41 in accordance with the radiation or convergence state of the light flux adjusted by the first relay lens 14, so that the depth of the void formed in the recording layer is controlled.

The second laser beam source 21 emits the second laser beam with a wavelength shorter than that of the first laser beam source 11. The second laser beam source 21 is a beam source configured to reproduce the information recorded in the optical information recording medium 41. When the information is recorded in the optical information recording medium 41 using the first laser beam source 11, a position control error signal used to control the object lens unit 31 is generated from the reflected beam of the second laser beam reflected from the optical information recording medium 41.

The second laser beam source 21 is a laser beam which is in a linearly polarized state, for example, a blue semiconductor laser. A wavelength $\lambda 2$ of the laser beam emitted from the second laser beam 21 is shorter than the wavelength $\lambda 1$ of the laser beam emitted from the first laser beam source 11. For example, the wavelength λ2 is in the range from 350 nm≦λ2≦450 nm.

The second collimator lens 22 allows the laser beam emitted from the second laser beam source 21 to be a parallel beam. The second laser beam which is the parallel beam is emitted to the polarized beam splitter 23 and the optical attenuator 29. The polarized beam splitter 23 and the optical attenuator 29 pass the second laser beam and emit the second laser beam to the second relay lens 24.

The polarized beam splitter 23 reflects the laser beam reflected from the optical information recording medium 41 from the reflection surface and emits the reflected laser beam to the photo-detector 37. The laser beam emitted from the polarized beam splitter 23 is condensed by the fifth condensing lens 39 and is incident on the photo-detector 37.

The photo-detector 37 receives the laser beam reflected from the optical information recording medium 41 and supplies a photoelectrically-converted signal to a signal processing unit 43.

Figure 2:
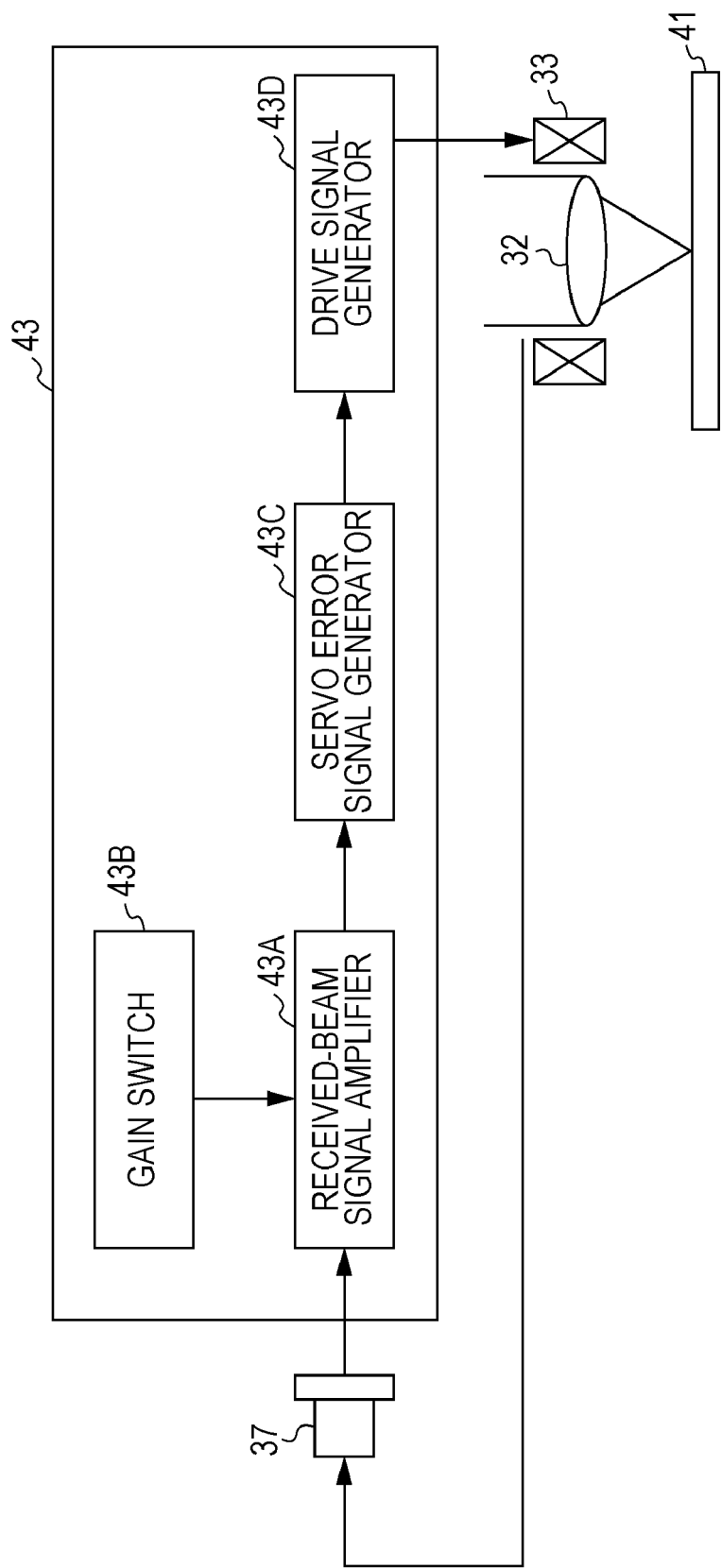
FIG. 2 is diagram of the configuration of a signal processing unit of the optical information recording reproduction apparatus according to the first embodiment of the disclosure.

As shown in FIG. 2, the signal processing unit 43 includes a received-beam signal amplifier 43A, a gain switch 43B, a servo error signal generator 43C, and a drive signal generator 43D.

The received-beam signal amplifier 43A electrically amplifies the signal photoelectrically converted by the photo-detector 37. At this time, since the intensity of the laser beam reflected from the optical information recording medium 41 in the recording is different from that in the reproducing, the intensities of the photoelectrically converted signal are different from each other. Therefore, it is necessary for the gain switch 43B to change the setting of electric gain in the recording and the reproducing. Specifically, the gain switch 43B changes an amplification factor in the received-beam signal amplifier 43A so as to be lower in the recording than in the reproducing.

The servo error signal generator 43C generates various kinds of detection signals from the signal amplified by the received-beam signal amplifier 43A. For example, when the information is recorded in the optical information recording medium 41, the servo error signal generator 43C generates a tracking error signal (TE) in accordance with, for example, a one-spot method based on the detection signals and generates a focus error signal (FE) in accordance with an astigmatic method. These generated signals are supplied to the drive signal generator 43D and a driving signal used to control the third actuator 33 is generated. Moreover, the third actuator 33 is controlled based on the driving signal to displace an object lens 32.

When the information in the optical information recording medium 41 is reproduced, the signal processing unit 43 generates a reproduction signal (RF) based on the detection signal.

The second relay lens 24 includes a second condensing lens 25, a second actuator 26, and a fourth condensing lens 27. The second actuator 26 displaces the second condensing lens 25, so that the laser beam is adjusted in accordance with a predetermined radiation or convergence state by the second condensing lens 25 and the fourth condensing lens 27 and the adjusted laser beam is emitted to the second quarter wavelength plate (QWP) 28. The local depth of the second laser beam in the optical information recording medium 41 is controlled in accordance with the radiation or convergence state of the parallel light flux adjusted by the second relay lens 24.

The first laser beam emitted from the first relay lens 14 to the first QWP 18 is converted from the linearly polarized beam to a circularly polarized beam, and then the circularly polarized beam is emitted to the dichroic mirror 35. The second laser beam is incident on the second QWP 28, is converted from the linearly polarized beam to the circularly polarized beam, and then is emitted to the dichroic mirror 35.

The dichroic mirror 35 passes the second laser beam using a wavelength difference and reflects the first laser beam from a reflection surface. The dichroic mirror 35 unites the optical path L1 of the first laser beam source and the optical path L2 of the second laser beam source with each other through the passing and reflection of the laser beams and emits the beams to the object lens unit 31.

The object lens unit 31 includes the object lens 32 and the third actuator 33 displacing the object lens 32. The first and second laser beams emitted from the dichroic mirror 35 are incident on the object lens 32. The object lens 32 condenses the incident first and second beams so as to bring the first and second beams into focus on the same axis as that of the optical information recording medium 41. The focal position is adjusted by the object lens 32 in such a manner that the third actuator 33 is controlled based on the driving signal from the above-described drive signal generator 43D and the object lens 32 is displaced.

When the position control signal for the object lens 32 is generated in the recording, the second laser beam reflected from a reference layer of the optical information recording medium 41 is used. The reference layer of the optical information recording medium 41 is generally configured by a metal layer or a dielectric layer. The reflection ratio of the reference layer is equal to or more than about a few %.

On the other hand, when the position control signal for the object lens 32 is generated in the reproducing, the second laser beam reflected from the record marks of the optical information recording medium 41 is used. The record mark is formed from a vacant hole formed in the recording layer. Therefore, the reflection from the record marks occurs due to the interface between the vacant holes with a reflection ratio of nearly 1 and the material of the recording layer, which surrounds the vacant hole, with a reflection ratio of nearly 1.5. The reflection ratio of the second laser beam on the interface is much lower than 1%. That is, the reflection ratio in the reproducing is about one several tenths, compared to the reflection ratio from the reference layer in the above-described recording. Therefore, the intensity of the laser beam reflected from the optical information recording medium 41 is high in the recording and is low in the reproducing.

Accordingly, in order for the same optical system to stably treat with the reflected beam in both the recording and the reproducing, it is necessary for the optical attenuator 29 to attenuate the beam quantity of the reflected beam detected by the photo-detector 37 in the recording so as to be the same as the beam quantity of the reflected beam in the reproducing. Alternatively, in order for the same electric circuit to stably process the reflected beam in both the recording and the reproducing, it is necessary to lower an amplification factor of the electric signal generated by receiving the reflected beam by the photo-detector 37 in the recording to one several tenths of that in the reproducing.

Example of Configuration of Optical Information Recording Medium

Figure 3:
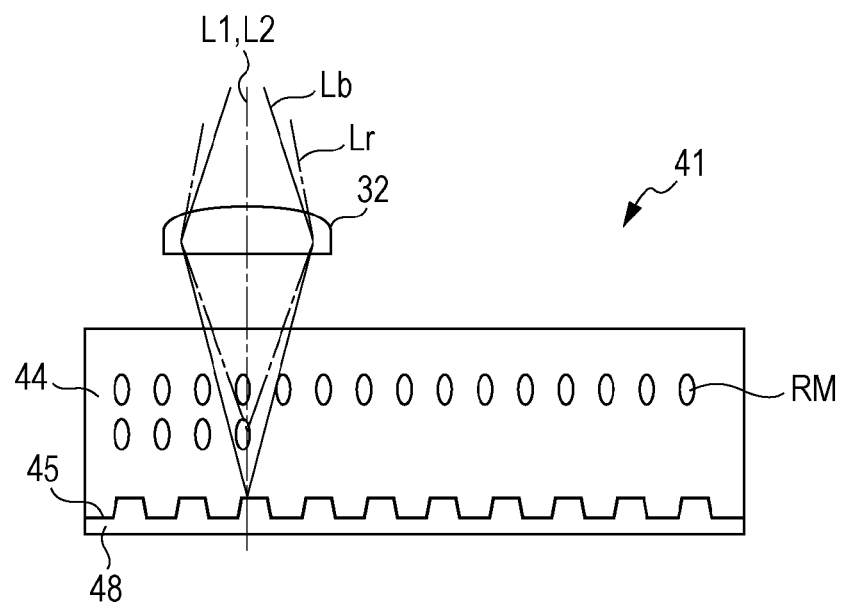
FIG. 3 is a diagram of a recording method performed by the optical information recording reproduction apparatus according to the first embodiment of the disclosure.

A volume recording type optical information recording medium is used as the optical information recording medium 41. For example, the volume recording type optical information recording medium is an optical disc which has a hole in the middle portion thereof and has a disc shape with a diameter of 120 mm and a thickness of 1.2 mm. As shown in FIG. 3, for example, the optical information recording medium 41 includes a reference layer 45 formed on a substrate 48 and a recording layer 44 formed on the reference layer 45.

The recording layer 44 is made of resin with an optical reactivity reacting on the recording first laser beam. When the recording first laser beam is emitted, bubbles or the like are generated at the focal position of a first laser beam spot by boiling or resolution of the resin with the optical reactivity. Record marks RM are formed in the vacant holes of the recording layer 44 due to the occurrence of the bubbles or the like.

The reference layer 45 is formed of a dielectric multilayer or the like and is configured to reflect the laser beam. In the reference layer 45, tracking servo guide grooves are formed. Specifically, spiral tracks are formed by the lands of convexes and the grooves of concaves. Addresses with a series of numbers for each predetermined recording unit are attached to the tracks and the tracks are specified by the addresses when information is recorded or reproduced.

In the optical information recording medium 41, it is preferable that the recording layer 44 is formed on the incident side of the beam from the optical information recording medium and the reference layer 45 is formed on the side opposite to the incident side of the recording layer.

In the recording, the vacant holes (record marks RM) are formed in the recording layer 44 by the first laser beam and the recording signal used to control the position of the object lens 33 is generated from the second laser beam reflected from the reference layer 45. In the reproducing, a reproducing signal and a signal for controlling the position of the object lens 33 are generated from the second laser beam reflected from the vacant holes (record marks RM) formed in the recording layer 44. When the reference layer 45 is formed closer to the incident side of the beam than the recording layer 44 in the optical information recording medium 41, a part of the second laser beam is necessarily reflected from the reference layer 45 in the reproducing, thereby reducing the beam quantity of the laser beam reaching the record marks RM of the recording layer 44. The reflection ratio of the vacant holes is about 0.2% and thus is very low. Therefore, since a part of the second laser beam is reflected from the reference layer 45, there is a concern that the SNR (Signal-Noise Ratio) of the reproduced signal may deteriorate. Accordingly, in regard to the optical information recording medium 41, it is preferable that the recording layer 44 is formed closer to the incident side of the optical information recording medium 41 than the reference layer 45.

Recording Method

Next, a method of recording the information in the optical information recording medium 41 using the above-described optical information recording reproduction apparatus 10 will be described.

In the recording, as shown in FIG. 1, the recording first laser beam source 11 emits the first laser beam which is a linearly polarized pulse laser beam with large peak power. Then, the first collimator lens 12 allows the first laser beam to be the parallel beam and the first relay lens 14 adjusts a desired radiation or convergence state of the light flux of the laser beam. The first laser beam adjusted in the radiation or convergence state of the light flux is reflected by the mirror 19, is converted into the circularly polarized beam by the first QWP 18, is reflected by the dichroic mirror 35, and then is incident on the object lens 32.

As shown in FIG. 3, a first laser beam Lr condensed by the object lens 32 is emitted to the recording layer 44 of the optical information recording medium 41. At this time, the two-photon absorption occurs at the condensed position of the first laser beam Lr in the recording layer 44, and thus the record marks RM are formed.

Moreover, the depth of the recording layer 44 in which the first laser beam Lr is condensed is different in accordance with the radiation or convergence state of the light flux adjusted by the first relay lens 14. Therefore, the first relay lens 14 adjusts the radiation or convergence state of the first laser beam in accordance with the recording depth at which the record marks RM are formed. Thus, since the depth direction at the focal position of the recording beam in the recording layer 44 can be changed by the relay lens disposed in the recording optical path, the recording beam is focused at a desired depth of the recording layer 44 of the optical information recording medium 41 to record the information.

When the information is recorded in the optical information recording medium rotating at a high speed, it is necessary to control the position of the object lens at high precision. Therefore, in the recording, as shown in FIG. 1, the second laser beam source 21 emits the linearly polarized second laser beam. Then, the second collimator lens 22 allows the second laser beam to be the parallel beam, the optical attenuator 29 and the polarized beam splitter 23 pass the second laser beam, and then the second relay lens 24 adjusts the light flux of the laser beam in accordance with a desired radiation or convergence state. The second laser beam adjusted in the light flux in accordance with the radiation or convergence state is converted into the circularly polarized beam by the second QWP 28, passes through the dichroic mirror 35, and then is incident on the object lens 32.

As shown in FIG. 3, a second laser beam Lb condensed by the object lens 32 is emitted to the reference layer 45 of the optical information recording medium 41. The reference layer 45 of the optical information recording medium 41 is disposed more inward than the recording layer 44, when viewed from the incident side of the laser beam. The second laser beam Lb is adjusted in accordance with the radiation or convergence state of the light flux by the second relay lens 24 so as to come into focus to the reference layer 45. Then, the second laser beam Lb reflected from the reference layer 45 is returned in the reverse direction along the optical path L2, passes through the object lens 32 and the dichroic mirror 35, and then is incident on the second QWP 28. In the second QWP 28, the circularly polarized beam of an opposite phase reflected from the optical recording medium 41 is made to be a linearly polarized beam in which a polarization plane is different by 90 degrees compared to a polarization plane of the second laser beam emitted from the second laser beam source 21. The laser beam passes through the second relay lens 24 and is incident on the optical attenuator 29. In the optical attenuator 29, the beam quantity of the beam reflected from the optical information recording medium 41 is attenuated so as to be the same as that in the recording and the reproducing described below. The laser beam attenuated so as to have the desirable beam quantity is incident on the polarized beam splitter 23 from the optical attenuator 29. Then, the laser beam is reflected from the reflection surface of the polarized beam splitter 23 and is emitted to the fifth condensing lens 39.

The laser beam is condensed by the fifth condensing lens 39 and is incident on the photo-detector 37. The photoelectrically converted signal is supplied to the signal processing unit 43. Then, in the signal processing unit 43, the received-beam signal amplifier 43A electrically amplifies the signal photoelectrically converted by the photo-detector 37. At this time, the gain switch 43B sets the electric gain so that the electric gain is lower than electric gain in the reproducing.

The servo error signal generator 43C generates the focus error signal (FE) and the tracking error signal (TE) from the signal amplified by the received-beam signal amplifier 43A in accordance with the same method as that of a general optical disc. The generated signals are supplied to the drive signal generator 43D to generate a driving signal for controlling the third actuator 33. The third actuator 33 of the object lens unit 31 is controlled based on the driving signal to control the object lens 32.

According to the above-described method, the recording can be realized in the optical information recording medium 41 using the first laser beam Lr emitted from the first laser beam source 11. Moreover, in the recording, the position of the object lens 32 can be controlled at high precision using the second laser beam Lb emitted from the second laser beam source 21.

Reproduction Method

Next, a method of reproducing the information recorded in the optical information recording medium 41 using the above-described optical information recording production apparatus 10 will be described.

In the reproducing, as shown in FIG. 1, the linearly polarized second laser beam is emitted from the second laser beam source 21. Then, the second collimator lens 22 allows the second laser beam to be the parallel beam, the polarized beam splitter 23 passes the second laser beam, and then the second relay lens 24 adjusts the light flux of the laser beam in accordance with a desired radiation or convergence state. The second laser beam adjusted in the light flux in accordance with the radiation or convergence state is converted into the circularly polarized beam by the second QWP 28, passes through the dichroic mirror 35, and then is incident on the object lens 32.

Figure 4:
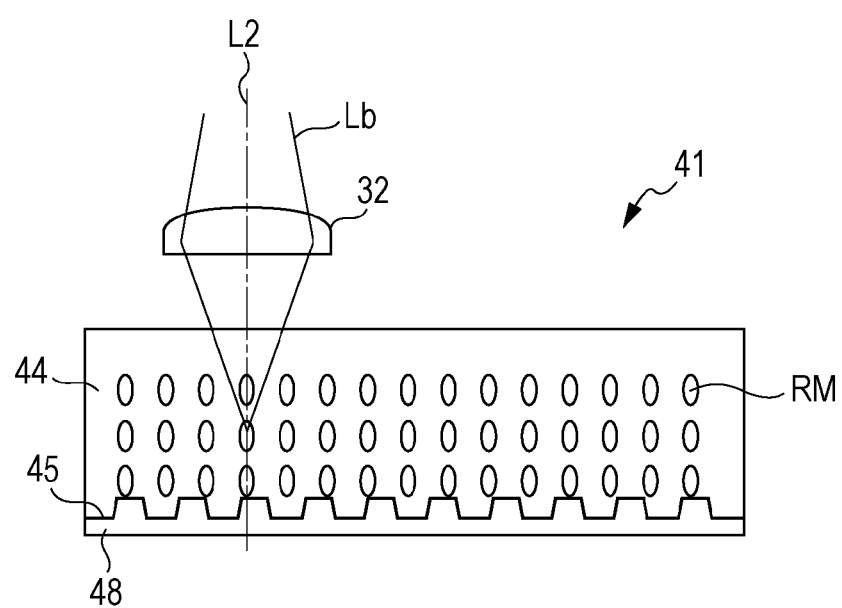
FIG. 4 is a diagram of a reproducing method performed by the optical information recording reproduction apparatus according to the first embodiment of the disclosure.

As shown in FIG. 4, the second laser beam Lb condensed by the object lens 32 is emitted to the recording layer 44 of the optical information recording medium 41. Then, the second laser beam Lb is condensed to the record marks RM formed in the recording layer 44 by the object lens 32. The focus depth of the second laser beam Lb in the recording layer 44 is adjusted by the above-described second relay lens 24.

Then, the second laser beam Lb reflected from the record marks RM is returned in the reverse direction along the optical path L2, passes through the object lens 32 and the dichroic mirror 35, and then is incident on the second QWP 28. In the second QWP 28, the circularly polarized beam of the opposite phase reflected from the optical recording medium 41 is made to be the linearly polarized beam in which a polarization plane is different by 90 degrees compared to a polarization plane of the second laser beam emitted from the second laser beam source 21. The laser beam passes through the second relay lens 24 and is incident on the polarized beam splitter 23. Then, the laser beam is reflected from the reflection surface of the polarized beam splitter 23, is condensed by the fifth condensing lens 39, is incident on the photo-detector 37, and is photoelectrically converted. Thus, the information recorded in the optical information recording medium 41 can be reproduced due to a difference in the reflection ratio based on the change in an optical constant from the record marks RM.

The beam reflected from the record marks RM is photoelectrically converted by the photo-detector 37 and is electrically amplified by the received-beam signal amplifier 43A. At this time, the gain switch 43B sets the electric gain so that the electric gain is higher than the electric gain in the reproducing. The servo error signal generator 43C generates the focus error signal (FE) and the tracking error signal (TE) from the signal amplified by the received-beam signal amplifier 43A in accordance with the same method as that of a general optical disc. The generated signals are supplied to the drive signal generator 43D to generate the driving signal for controlling the third actuator 33. The third actuator 33 is controlled based on the driving signal to control the object lens 32.

As described above, in the optical information recording reproduction apparatus 10 according to this embodiment, the first laser beam source emits the recording laser beam and the second laser beam source emits the beam for controlling the position of the object lens when the information is recorded in the volume recording type optical information recording medium. In the reproducing, the second laser beam source emits the reproducing laser beam and the beam for controlling the position of the object lens.

By emitting the recording laser beam with the wavelength longer than that of the reproducing laser beam from the first laser beam source, the recording material with the good two-photon absorption property is applicable to the recording medium, thereby realizing the high recording transmission rate. Moreover, by emitting the reproduction laser beam with the short wavelength from the second laser beam source, it is possible to read the information recorded at high density due to the two-photon absorption.

Furthermore, when the information is recorded in the recording medium using the first laser beam source, the position of the object lens can be controlled at high precision using the laser beam with the short wavelength emitted from the second laser beam source.

By using the first laser beam with the wavelength $\lambda 1$ of, for example, about 650 nm in the first laser beam source for information recording, more various materials are applicable to the recording layer of the optical information recording medium applied in the efficiency of the two-photon absorption at the long wavelength. Since the information can be recorded using a red beam or an infrared beam high in the efficiency of the two-photon absorption, there can be used the red beam by which the information in the high-density recording medium can be reproduced in the reproducing. Moreover, the recording blue beam can be used in the servo control of the recording.

2. Second Embodiment of Optical Information Recording Reproduction Apparatus

Example of Configuration of Optical Information Recording Reproduction Apparatus Next, an optical recording method will be described according to a second embodiment of the disclosure.

Figure 5:
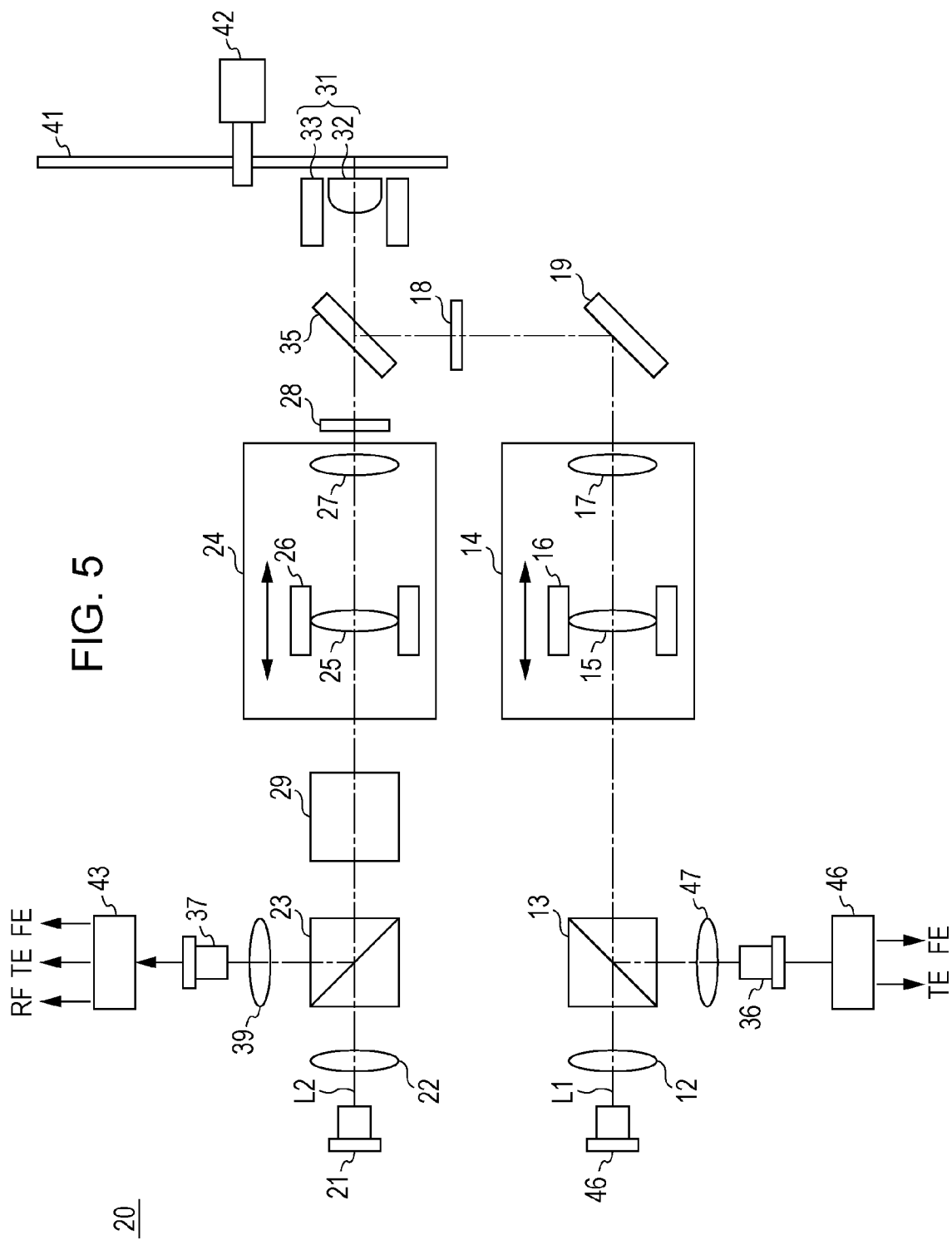
FIG. 5 is a diagram of the overall configuration of an optical information recording reproduction apparatus according to a second embodiment of the disclosure.

FIG. 5 shows the overall configuration of an optical information recording reproduction apparatus associated with the optical recording method according to this embodiment.

The optical information recording reproduction apparatus shown in FIG. 5 includes a first laser beam source 46 serving as a first beam source and a second laser beam source 21 serving as a second beam source. A first laser beam from the first laser beam source 46 and a second laser beam from the second laser beam source 21 are emitted to an optical information medium 41.

A first collimator lens 12, a first polarized beam splitter 13, a first relay lens 14, a mirror 19, and a first quarter wavelength plate (QWP) 18 are provided along an optical path L1 of the first laser beam source 46. A sixth condensing lens 47 and a first photo-detector (PD) 36 serving as an optical detection unit detecting a beam reflected from the optical information recording medium 41 are provided along an optical path divided from the first polarized beam splitter 13.

A second collimator lens 22, a second polarized beam splitter 23, an optical attenuator 29, a second relay lens 24, and a second quarter wavelength plate (QWP) 28 are provided along an optical path L2 of the second laser beam source 21.

A fifth condensing lens 39 and a second photo-detector (PD) 37 serving as an optical detection unit detecting a beam reflected from the optical information recording medium 41 are provided along an optical path divided from the second polarized beam splitter 23.

A dichroic mirror (DCM) 35 reflecting the first laser beam and passing the second laser beam is disposed at the intersection between the optical path L1 of the first laser beam source 46 and the optical path L2 of the second laser beam source 21. Moreover, an object lens unit 31, the optical information medium 41, and a spindle 42 are disposed along an optical path in which the two beams are combined with each other in the dichroic mirror 35.

The first laser beam source 46 is a beam source for recording information in the optical information recording medium 41. For example, the first laser beam source 46 is an infrared semiconductor laser. A wavelength λ1 of the laser beam emitted from the first laser beam source 46 is longer than a wavelength λ2 of the laser beam emitted from the second laser beam source 21 and is the wavelength of a red beam with 600 nm≦λ1≦700 nm or the wavelength of an infrared beam with 730 nm≦λ1≦830 nm. The first laser beam emitted from the first laser beam source 46 is a laser beam in a linearly polarized state.

In regard to the information recording performed using the above-described two-photon absorption, it is considered that the same in-plane recording density as that of a BD (Blu-ray Disc: registered trademark) is achieved due to the above-described reason even when recording is performed using a laser beam with a large wavelength of a wavelength of 405 nm, for example, an infrared laser beam with a wavelength of 640 nm.

On the other hand, when the information is reproduced, it is necessary to ensure the same optical resolution as that of BD in order to read mark lines recorded at the same density of that of BD. Accordingly, a blue laser with a wavelength of, for example, 405 nm is preferably used as the reproduction laser beam.

The first collimator lens 12 allows the first laser beam emitted from the first laser beam source 46 to be a parallel beam and emits the parallel beam to the first polarized beam splitter 13. The first polarized beam splitter 13 passes the first laser beam from the first collimator lens 12 and emits the first laser beam to the first relay lens 14.

The first polarized beam splitter 13 reflects the laser beam reflected from the optical information recording medium 41 and emits the reflected laser beam to the first photo-detector 36. The laser beam emitted from the first polarized beam splitter 13 is condensed by the sixth condensing lens 47 and is incident on the first photo-detector 36.

The first photo-detector 36 receives the laser beam reflected from the optical information recording medium 41, performs photoelectrical conversion to generate various kinds of detection signals in accordance with the amount of the received laser beam, and supplies the photoelectrically-converted signals to a first signal processing unit 46.

For example, when the information of the optical information recording medium 41 is reproduced, the first signal processing unit 46 generates a tracking error signal (TE) in accordance with, for example, a one-spot method based on the detection signals and generates a focus error signal (FE) in accordance with an astigmatic method. These generated signals are supplied to a driving control unit (not shown). Then, the driving control unit controls the third actuator 33 based on the tracking error signal and the focus error signal to displace the object lens 32.

The first relay lens 14 includes a first condensing lens 15, a first actuator 16, and a third condensing lens 17. The first actuator 16 displaces the first condensing lens 15, and then the first condensing lens 15 being displaced and the third condensing lens 17 adjust the laser beam in accordance with a predetermined radiation or convergence state of the light flex to emit the laser beam to the first QWP 18. The focal position of the first laser beam is controlled in the depth direction of the recording layer of the optical information recording medium 41 in accordance with the radiation or convergence state of the parallel light flux adjusted by the first relay lens 14, so that the depth of the void formed in the recording layer is controlled.

The second laser beam source 21 emits the second laser beam with a wavelength shorter than that of the first laser beam source 46. The second laser beam source 21 is a beam source configured to reproduce the information recorded in the optical information recording medium 41. When the information is recorded in the optical information recording medium 41 using the first laser beam source 46, a position control error signal used to control the object lens unit 31 is generated from the reflected beam of the second laser beam reflected from the optical information recording medium 41.

For example, the second laser beam source 21 is a blue semiconductor laser. The wavelength λ2 of the laser beam emitted from the second laser beam 21 is shorter than the wavelength λ1 of the laser beam emitted from the first laser beam source 46. For example, the wavelength λ2 is in the range from 350 nm≦λ2≦450 nm.

The second collimator lens 22 allows the laser beam emitted from the second laser beam source 21 to be a parallel beam. The second laser beam which is the parallel beam is emitted to the second polarized beam splitter 23 and the optical attenuator 29. The second polarized beam splitter 23 and the optical attenuator 29 pass the second laser beam from the second collimator lens 22 and emit the second laser beam to the second relay lens 24.

The second polarized beam splitter 23 reflects the laser beam reflected from the optical information recording medium 41 from the reflection surface and emits the reflected laser beam to the second photo-detector 37. The laser beam emitted from the second polarized beam splitter 23 is condensed by the fifth condensing lens 39 and is incident on the second photo-detector 37.

The second photo-detector 37 receives the laser beam reflected from the optical information recording medium 41 and supplies a photoelectrically-converted signal to a second signal processing unit 43.

As shown in FIG. 2, the second signal processing unit 43 includes a received-beam signal amplifier 43A, a gain switch 43B, a servo error signal generator 43C, and a drive signal generator 43D.

The received-beam signal amplifier 43A electrically amplifies the signal photoelectrically converted by the second photo-detector 37. At this time, since the intensity of the laser beam reflected from the optical information recording medium 41 in the recording is different from that in the reproducing, the intensities of the photoelectrically converted signal are different from each other. Therefore, it is necessary for the gain switch 43B to change the setting of electric gain in the recording and the reproducing. Specifically, the gain switch 43B changes an amplification factor in the received-beam signal amplifier 43A so as to be lower in the recording than in the reproducing.

The servo error signal generator 43C generates various kinds of detection signals from the signal amplified by the received-beam signal amplifier 43A. For example, when the information is recorded in the optical information recording medium 41, the servo error signal generator 43C generates a tracking error signal (TE) in accordance with, for example, a one-spot method based on the detection signals and generates a focus error signal (FE) in accordance with an astigmatic method. These generated signals are supplied to the drive signal generator 43D and a driving signal used to control the third actuator 33 is generated. Moreover, the third actuator 33 is controlled based on the driving signal to displace an object lens 32.

When the information in the optical information recording medium 41 is reproduced, the second signal processing unit 43 generates a reproduction signal (RF) based on the detection signal.

The second relay lens 24 includes a second condensing lens 25, a second actuator 26, and a fourth condensing lens 27. The second actuator 26 displaces the second condensing lens 25, so that the laser beam is adjusted in accordance with a predetermined radiation or convergence state by the displaced second condensing lens 25 and the fourth condensing lens 27 and the adjusted laser beam is emitted to the second quarter wavelength plate (QWP) 28. The local depth of the second laser beam in the optical information recording medium 41 is controlled in accordance with the radiation or convergence state of the parallel light flux adjusted by the second relay lens 24.

The first laser beam is incident on the first QWP 18, is converted from the linearly polarized laser beam to the circularly polarized beam, and then is emitted to the dichroic mirror 35. The second laser beam is incident on the second QWP 28, is converted from the linearly polarized laser beam to the circularly polarized beam, and then is emitted to the dichroic mirror 35.

The dichroic mirror 35 passes the second laser beam using a wavelength difference and reflects the first laser beam from a reflection surface. The dichroic mirror 35 unites the optical path L1 of the first laser beam source and the optical path L2 of the second laser beam source with each other through the passing and reflection of the laser beams and emits the beams to the object lens unit 31.

The object lens unit 31 includes the object lens 32 and the third actuator 33 displacing the object lens 32. The first and second laser beams emitted from the dichroic mirror 35 are incident on the object lens 32. The object lens 32 condenses the incident first and second laser beams so as to come into focus on the same axis as that of the optical information recording medium 41. The focal position is adjusted by the object lens 32 in such manner that the third actuator 33 is controlled based on the tracking error signal and the focus error signal described above and the object lens 32 is displaced.

When the position control signal for the object lens 32 is generated in the recording, the second laser beam reflected from a reference layer of the optical information recording medium 41 is used. The reference layer of the optical information recording medium 41 is generally configured by a metal layer or a dielectric layer. The reflection ratio of the reference layer is equal to or more than about a few %.

On the other hand, when the position control signal for the object lens 32 is generated in the reproducing, the second laser beam reflected from the record marks RM of the optical information recording medium 41 is used. The record mark RM is formed from a vacant hole formed in the recording layer. Therefore, the reflection from the record marks RM occurs due to the interface between the vacant holes with a reflection ratio of nearly 1 and the material of the recording layer, which surrounds the vacant hole, with a reflection ratio of nearly 1.5. The reflection ratio of the second laser beam on the interface is much lower than 1%. That is, the reflection ratio in the reproducing is about one several tenths, compared to the reflection ratio from the reference layer in the above-described recording. Therefore, the intensity of the laser beam reflected from the optical information recording medium 41 is high in the recording and is low in the reproducing.

Accordingly, in order for the same optical system to stably process the reflected beam in both the recording and the reproducing, it is necessary for the optical attenuator 29 to attenuate the beam quantity of the reflected beam detected by the photo-detector in the recording so as to be the same as the beam quantity of the reflected beam in the reproducing. Alternatively, in order for the same electric circuit to stably process the reflected beam in both the recording and the reproducing, it is necessary to lower an amplification factor of the electric signal generated by receiving the reflected beam by the second photo-detector 37 in the recording to one several tenths of that in the reproducing.

A volume recording type optical information recording medium including a reference layer 45 formed on a substrate 48 and a recording layer 44 formed on the reference layer 45, as described with reference to FIG. 3, is used as the optical information recording medium 41.

The recording layer 44 is made of resin with an optical reactivity reacting on the recording first laser beam. When the recording first laser beam is emitted, bubbles or the like are generated at the focal position of a first laser beam spot by boiling or resolution of the resin with the optical reactivity. Record marks RM are formed in the vacant holes of the recording layer 44 due to the occurrence of the bubbles or the like.

The reference layer 45 is formed of a dielectric multilayer or the like and is configured to reflect the laser beam. In the reference layer 45, tracking servo guide grooves are formed. Specifically, spiral-shaped tracks are formed by the lands of convexes and the grooves of concaves. Addresses with a series of numbers for each predetermined recording unit are attached to the tracks and the tracks are specified by the addresses when information is recorded or reproduced.

In the optical information recording medium 41, it is preferable that the recording layer 44 is formed on the incident side of the beam from the optical information recording medium and the reference layer 45 is formed on the side opposite to the incident side of the recording layer.

Recording Method

Next, a method of recording the information in the optical information recording medium 41 using the above-described optical information recording reproduction apparatus 20 will be described.

In the recording, as shown in FIG. 5, the recording first laser beam source 46 emits the first laser beam. Then, the first collimator lens 12 allows the first laser beam to be the parallel beam, the parallel beam passes through the first polarized beam splitter 13, and then the first relay lens 14 adjusts a desired radiation or convergence state of the light flux of the laser beam. The first laser beam adjusted in the radiation or convergence state of the light flux is reflected by the mirror 19, is converted into the circularly polarized beam by the first QWP 18, is reflected by the dichroic mirror 35, and then is incident on the object lens 32.

Figure 6:
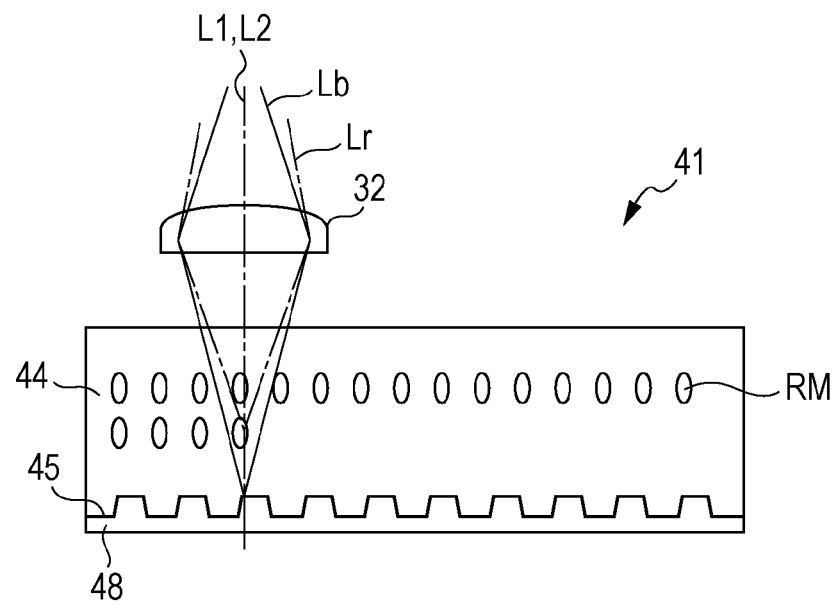
FIG. 6 is diagram of a recording method performed by the optical information recording reproduction apparatus according to the second embodiment of the disclosure.

As shown in FIG. 6, a first laser beam Lr condensed by the object lens 32 is emitted to the recording layer 44 of the optical information recording medium 41. At this time, the two-photon absorption occurs at the condensed position of the first laser beam Lr in the recording layer 44, and thus the record marks RM are formed.

Moreover, the depth of the recording layer 44 in which the first laser beam Lr is condensed is different in accordance with the radiation or convergence state of the light flux adjusted by the first relay lens 14. Therefore, the first relay lens 14 adjusts the radiation or convergence state of the first laser beam in accordance with the recording depth at which the record marks RM are formed. Thus, since the depth direction at the focal position of the recording beam in the recording layer 44 can be changed by the relay lens disposed in the recording optical path, the recording beam is focused at a desired depth of the recording layer 44 of the optical information recording medium 41 so as to record the information.

As shown in FIG. 5, the position of the object lens is controlled at high precision using the second laser beam source 21.

In the recording, as shown in FIG. 5, the second laser beam source 21 emits the linearly polarized second laser beam. Then, the second collimator lens 22 allows the second laser beam to be the parallel beam, the optical attenuator 29 and the second polarized beam splitter 23 pass the second laser beam, and then the second relay lens 24 adjusts a desired radiation or convergence state of the light flux of the laser beam. The second laser beam adjusted in the radiation or convergence state of the light flux is converted into the circularly polarized beam by the second QWP 28, passes through the dichroic mirror 35, and then is incident on the object lens 32.

As shown in FIG. 6, a second laser beam Lb condensed by the object lens 32 is emitted to the reference layer 45 of the optical information recording medium 41. The reference layer 45 of the optical information recording medium 41 is disposed more inward than the recording layer 44, when viewed from the incident side of the laser beam. The second laser beam Lb is adjusted in accordance with the radiation or convergence state of the light flux by the second relay lens 24 so as to come into focus in the reference layer 45. Then, the second laser beam Lb reflected from the reference layer 45 is returned in the reverse direction along the optical path L2, passes through the object lens 32 and the dichroic mirror 35, and then is incident on the second QWP 28. In the second QWP 28, the circularly polarized beam of an opposite phase reflected from the optical recording medium 41 is made to be a linearly polarized beam in which a polarization plane is different by 90 degrees compared to a polarization plane of the second laser beam emitted from the second laser beam source 21. The laser beam passes through the second relay lens 24 and is incident on the optical attenuator 29. In the optical attenuator 29, the beam quantity of the beam reflected from the optical information recording medium 41 is attenuated so as to be the same as that in the recording and the reproducing described below. The laser beam attenuated so as to have the desirable beam quantity is incident on the second polarized beam splitter 23 from the optical attenuator 29. Then, the laser beam is reflected from the reflection surface of the second polarized beam splitter 23 and is emitted to the fifth condensing lens 39.

The laser beam is condensed by the fifth condensing lens 39 and is incident on the second photo-detector 37. The photoelectrically converted signal is supplied to the second signal processing unit 43. Then, in the second signal processing unit 43, the received-beam signal amplifier 43A electrically amplifies the signal photoelectrically converted by the second photo-detector 37. At this time, the gain switch 43B sets the electric gain so that the electric gain is lower than electric gain in the reproducing. The servo error signal generator 43C generates the focus error signal (FE) and the tracking error signal (TE) from the signal amplified by the received-beam signal amplifier 43A in accordance with the same method as that of a general optical disc. The generated signals are supplied to the drive signal generator 43D to generate a driving signal for controlling the third actuator 33. The third actuator 33 of the object lens unit 31 is controlled based on the driving signal to control the object lens 32.

According to the above-described method, the position of the object lens 32 can be controlled at high precision.

Reproduction Method

Next, a method of reproducing the information recorded in the optical information recording medium 41 using the above-described optical information recording production apparatus 20 will be described.

In the reproducing, as shown in FIG. 5, the linearly polarized second laser beam is emitted from the second laser beam source 21. Then, the second collimator lens 22 allows the second laser beam to be the parallel beam, the second polarized beam splitter 23 passes the second laser beam, and then the second relay lens 24 adjusts the light flux of the laser beam in accordance with a desired radiation or convergence state. The second laser beam adjusted in the light flux in accordance with the radiation or convergence state is converted into the circularly polarized beam by the second QWP 28, passes through the dichroic mirror 35, and then is incident on the object lens 32.

Figure 7:
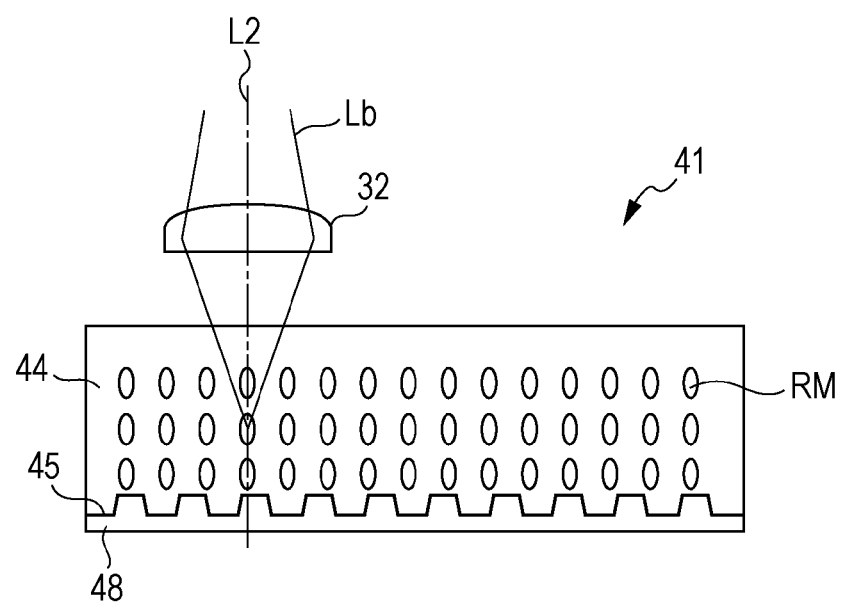
FIG. 7 is a diagram of a reproducing method performed by the optical information recording reproduction apparatus according to the second embodiment of the disclosure.

As shown in FIG. 7, the second laser beam Lb condensed by the object lens 32 is emitted to the recording layer 44 of the optical information recording medium 41. Then, the second laser beam Lb is condensed to the record marks RM formed in the recording layer 44 by the object lens 32. The focus depth of the second laser beam Lb in the recording layer 44 is adjusted by the above-described second relay lens 24.

Then, the second laser beam Lb reflected from the record marks RM is returned in the reverse direction along the optical path L2, passes through the object lens 32 and the dichroic mirror 35, the second QWP 28, and the second relay lens 24, and then is incident on the second polarized beam splitter 23. Then, the laser beam is reflected from the reflection surface of the second polarized beam splitter 23, is condensed by the fifth condensing lens 39, and is incident on the second photo-detector 37. Then, the laser beam is photoelectrically converted by the second photo-detector 37 and is electrically amplified by the received-beam signal amplifier 43A. At this time, the gain switch 43B sets the electric gain so that the electric gain is higher than that in the recording. The servo error signal generator 43C generates the focus error signal (FE) and the tracking error signal (TE) from the signal amplified by the received-beam signal amplifier 43A in accordance with the same method as that of a general optical disc. The generated signals are supplied to the drive signal generator 43D to generate the driving signal for controlling the third actuator 33. The third actuator 33 is controlled based on the driving signal to control the object lens 32.

Thus, the information recorded in the optical information recording medium 41 can be reproduced due to a difference in the reflection ratio based on the change in an optical constant from the record marks RM.

Figure 8:
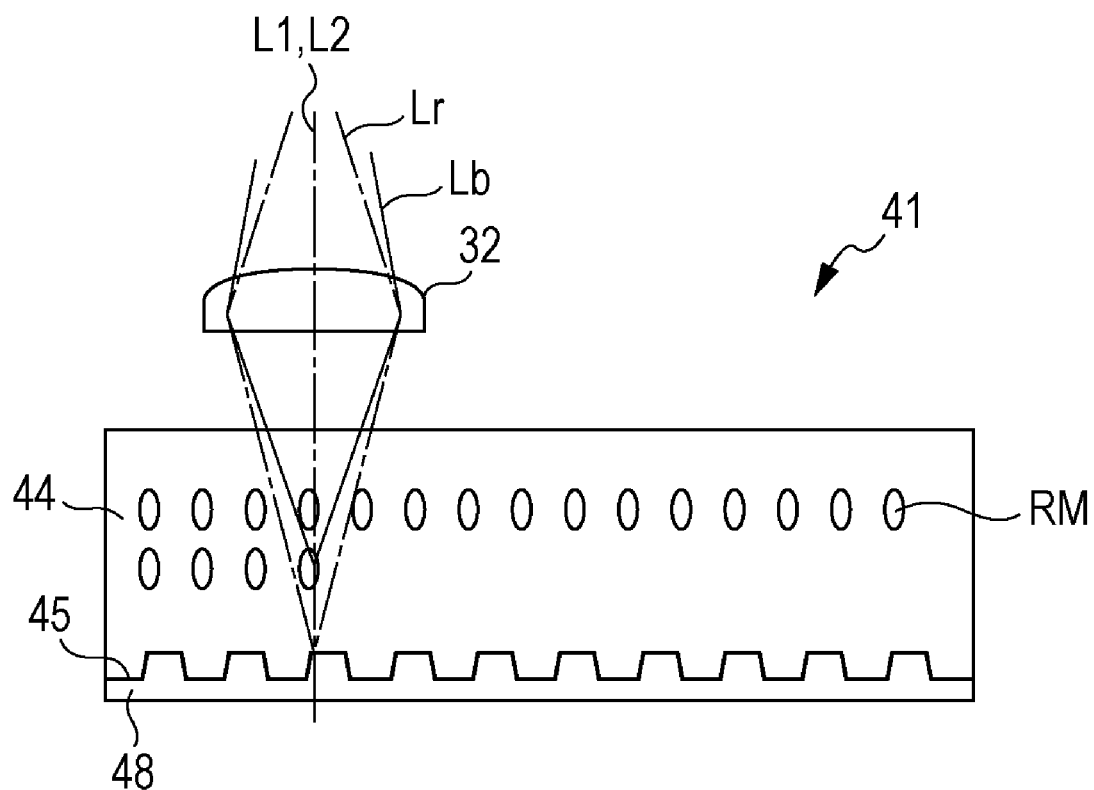
FIG. 8 is a diagram of the reproducing method performed by the optical information recording reproduction apparatus according to the second embodiment of the disclosure.

In the reproducing, as shown in FIG. 8, the position of the object lens can be controlled at high precision using the first laser beam source 46.

As shown in FIG. 5, the first laser beam source 46 emits the linearly polarized first laser beam. Then, the first collimator lens 12 allows the first laser beam to be the parallel beam, the first polarized beam splitter 13 pass the first laser beam, and then the first relay lens 14 adjusts the light flux of the laser beam in accordance with a desired radiation or convergence state. The first laser beam adjusted in the light flux in accordance with the radiation or convergence state is converted into the circularly polarized beam by the first QWP 18, is reflected by the dichroic mirror 35, and then is incident on the object lens 32.

As shown in FIG. 8, the first laser beam Lr condensed by the object lens 32 is emitted to the reference layer 45 of the optical information recording medium 41. The reference layer 45 of the optical information recording medium 41 is disposed more inward than the recording layer 44, when viewed from the incident side of the laser beam. The first laser beam Lr is adjusted in accordance with the radiation or convergence state of the light flux by the second relay lens 24 so as to come into focus on the reference layer 45. Then, the first laser beam Lr reflected from the reference layer 45 is returned in the reverse direction along the optical path L1, passes through the object lens 32, and then is reflected by the dichroic mirror 35. In the first QWP 18, the circularly polarized beam of an opposite phase reflected from the optical recording medium 41 is made to be a linearly polarized beam in which a polarization plane is different by 90 degrees compared to a polarization plane of the second laser beam emitted from the first laser beam source 46. The laser beam passes through the first relay lens 14 and is incident on the first polarized beam splitter 13. Then, the laser beam is reflected from the reflection surface of the first polarized beam splitter 13 and is emitted to the sixth condensing lens 47.

The laser beam is condensed by the sixth condensing lens 47, is incident on the first photo-detector 36, and is photo-electrically converted, so that various kinds of detection signals are generated in accordance with the amount of received beam. When the generated various kinds of detection signals are supplied to the first signal processing unit 46, the focus error signal (FE) and the tracking error signal (TE) are generated by the same process as the process performed in the above-described second signal processing unit 43. Then, the third actuator 33 of the object lens unit 31 is controlled using the generated signals to control the position of the object lens 32.

According to the above-described method, the position of the object lens 32 can be controlled at high precision using the first laser beam source 46 when the information is reproduced using the second laser beam source 21.

In the optical information recording reproduction apparatus according to this embodiment, as described above, the first laser beam source is used as a laser beam source emitting the recording laser beam and the second laser beam source is used as a laser beam source emitting the laser beam for controlling the position of the object lens in order to record information in the volume recording type optical information recording medium. In the reproducing, the second laser beam source is used as a laser beam source emitting the reproduction laser beam and the laser beam for controlling the position of the object lens. Moreover, in the reproducing, the second laser beam source is used as a laser beam source emitting the reproduction laser beam and the first laser beam source emitting the laser beam for controlling the position of the object lens.

The first laser beam source emits the semiconductor laser beam source emitting the recording laser beam with the wavelength longer than that of the reproduction laser beam, so that the recording material with the good two-photon absorption property is applicable to the recording medium. Therefore, it is possible to realize the high recording transmission rate. Moreover, by emitting the reproduction laser beam with the short wavelength from the second laser beam source, it is possible to read the recorded information at high precision by the two-photon absorption.

Furthermore, in the reproducing, it is possible to control the position of the object lens at high precision using the first laser beam source.

In the optical information recording reproduction apparatus with the above-described configuration, the semiconductor laser beam can be used as the recording laser beam when information is recorded in the volume recording type optical information recording medium. Accordingly, it is possible to construct an inexpensive drive system.

In the above-described embodiments, the example has hitherto been described in which not only the optical attenuator attenuates the beam quantity but also the signal processing unit performs the gain conversion. However, the optical method of such an optical attenuator and the electric gain adjustment may not be used together. For example, the beam quantities of the beam reflected from the optical information recording medium may be the same as each other in the recording and the reproducing by independently using one of the optical method of the optical attenuator and the electric gain adjustment in accordance with the configuration or the like of the optical information recording reproduction apparatus. At this time, the optical information recording reproduction apparatus may include one of the optical attenuator and the configuration of the gain conversion, or may include both the optical attenuator and the configuration of the gain conversion so that one thereof is selectively operated.

The present disclosure contains subject matter related to that disclosed in Japanese Priority Patent Application JP 2010-154261 filed in the Japan Patent Office on Jul. 6, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical information recording reproduction apparatus comprising:
    a first light beam source;
    a second light beam source emitting a beam with a wavelength shorter than that of the first light beam source; and
    an object lens condensing the beams from the first and second light beam sources to an optical information recording medium,
    wherein when information is recorded in the optical information recording medium, a recording beam is emitted from the first light beam source and a beam used to generate a signal for controlling a position of the object lens is emitted from the second light beam source, and wherein when the information of the optical information recording medium is reproduced, a reproduction beam is emitted from the second light beam source;
    an optical attenuator,
    wherein the optical attenuator adjusts a beam quantity which is supplied from the second light beam source and is incident on the optical detection unit in the recording so as to be the same as a beam quantity which is supplied from the second light beam source and is incident on the optical detection unit in the reproducing.

2. The optical information recording reproduction apparatus according to claim 1, further comprising:
    a beam detection unit detecting a beam reflected from the optical information recording medium; and a signal processing unit,
wherein in the signal processing unit, an electric gain is set to be lower in the recording than in the reproducing to generate the signal for controlling the position of the object lens.

3. The optical information recording reproduction apparatus according to claim 1, wherein in the optical information recording medium, a layer in which the information is recorded in the recording is closer to an incident side of the beams from the first and second light beam sources than a layer from which the beam from the second light beam source is reflected.

4. The optical information recording reproduction apparatus according to claim 1, wherein when the information of the optical information recording medium is reproduced, a beam used to generate the signal for controlling the position of the object lens is emitted from the first light beam source.

5. An optical information recording reproduction method comprising:
when information is recorded in an optical information recording medium,
emitting a recording beam from a first light beam source, and
emitting a beam with a wavelength shorter than that of the recording beam emitted from the first light beam source from the second light beam source and generating a signal for controlling a position of an object lens;
when the information is reproduced,
emitting the beam with a wavelength shorter than that of the recording beam emitted from the first light beam source from the second light beam source and reading the information recorded in the optical information recording medium; and
using an optical attenuator to adjust a beam quantity supplied from the second beam source so as to be a same beam quantity supplied from the second light beam source incident on an optical detection unit in the optical information recording medium.

* * * * *